US012532107B2

(12) United States Patent

Liu et al.

(10) Patent No.: US 12,532,107 B2
(45) Date of Patent: Jan. 20, 2026

(54) SPEAKER MODULE

(71) Applicant: AAC Microtech (Changzhou) Co., Ltd., Jiangsu (CN)

(72) Inventors: Hailin Liu, Changzhou (CN); Hong Li, Changzhou (CN); Wu Wang, Changzhou (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 172 days.

(21) Appl. No.: 18/629,977

(22) Filed: Apr. 9, 2024

(65) Prior Publication Data

US 2025/0203274 A1 Jun. 19, 2025

Related U.S. Application Data

(63) Continuation of application No. PCT/CN2023/139577, filed on Dec. 18, 2023.

(51) Int. Cl.

*H04R 1/28* (2006.01)
*H04R 9/02* (2006.01)
*H04R 9/06* (2006.01)

(52) U.S. Cl.

CPC ......... *H04R 1/2811* (2013.01); *H04R 1/2857* (2013.01); *H04R 9/025* (2013.01); *H04R 9/06* (2013.01)

(58) Field of Classification Search

CPC .... H04R 1/2811; H04R 1/2857; H04R 9/025; H04R 9/06; H04R 2499/11
See application file for complete search history.

(56) References Cited

FOREIGN PATENT DOCUMENTS

CN 205847581 U * 12/2016

* cited by examiner

*Primary Examiner* — Tuan D Nguyen
(74) *Attorney, Agent, or Firm* — Wiersch Law Group

(57) ABSTRACT

A speaker module is disclosed. The speaker module includes a shell, a speaker unit and a ring body. The speaker unit includes a frame, a magnetic circuit system, a vibration system having a diaphragm in a ring shape surrounding the ring body. The magnetic circuit system includes a yoke and a main magnetic unit. A through hole penetrates through the yoke and the main magnetic unit and is covered by a waterproof and air-permeable membrane. The ring body is sandwiched between the main magnetic unit and the shell. The diaphragm is fixed between the frame and the main magnetic unit. The membrane, the main magnetic unit, the ring body and the shell together form a resonance cavity. An access of the ring body communicates the resonance cavity and a front cavity. The speaker module enhances the high-frequency sensitivity, and also saves the space and simplifies the production process.

9 Claims, 3 Drawing Sheets

A-A

A-A

SPEAKER MODULE

FIELD OF THE PRESENT DISCLOSURE

The present disclosure relates to electroacoustic transducers, in particular to a speaker module.

DESCRIPTION OF THE RELATED ART

With the development of science and technology, portable electronic products, such as mobile phones, handheld game consoles, navigation devices and handheld multimedia entertainment devices, are widely used in people's daily life. Since emitting sounds is an essential function of these portable electronic products and the quality of sounds directly affects user's experiences when using these portable electronic products, the requirements for speaker modules used therein are getting higher and higher.

Volumes of front and back cavities of a speaker module in the related art are often compressed to meet the miniaturization requirement. In this way, for the speaker module, it is not only easy to make a diaphragm for emitting sounds bulging or dented, but also cause a low high-frequency sensitivity, which seriously affect the acoustic performances.

Thus, it is necessary to provide a novel speaker module to solve the problems.

SUMMARY

An objective of the present disclosure is to overcome the above technical problems and provide a speaker module which can improve the acoustic performances.

In order to achieve the objective mentioned above, the present disclosure discloses a speaker module including a shell having a containing space, a speaker unit contained in the containing space and a ring body. The shell includes an upper shell and a lower shell engaged with the upper shell for forming the containing space. The speaker unit includes a frame, a magnetic circuit system and a vibration system that are fixed to the frame, a through hole and a waterproof and air-permeable membrane. The magnetic circuit system includes a yoke, a main magnetic unit disposed on the yoke, and a secondary magnetic unit disposed on the yoke and surrounding the main magnetic unit for forming a magnetic gap. The vibration system includes a diaphragm in a ring shape and a voice coil located in the magnetic gap for driving the diaphragm for vibrating and emitting sounds. The through hole penetrates through the yoke and the main magnetic unit. The membrane is attached on the yoke and covers a side of the through hole close to the upper shell. The ring body is sandwiched between the main magnetic unit and the lower shell. An outer edge of the diaphragm is fixed to the frame, and an inner edge of the diaphragm is fixed to the main magnetic unit and surrounds the ring body. The membrane, the main magnetic unit, the ring body and the lower shell together form a resonance cavity. The diaphragm, the lower shell and the ring body together form a front cavity. The ring body is provided with an access communicating the resonance cavity and the front cavity.

As an improvement, the main magnetic unit includes an upper main magnet and a lower main magnet opposite to each other and a main magnetically conductive plate sandwiched between the upper main magnet and the lower main magnet. The through hole penetrates through the yoke, the upper main magnet, the lower main magnet and the main magnetically conductive plate. The ring body and the inner edge of the diaphragm are fixed to the lower main magnet.

As an improvement, the lower shell is provided with an acoustic channel disposed at a side of the speaker module. The acoustic channel communicates the front cavity.

As an improvement, the access locates at a side of the ring body close to the acoustic channel.

As an improvement, the ring body includes a first end fixed to the lower main magnet and a second end fixed to the lower shell. The access is formed by recessing from the second end toward the first end.

As an improvement, an inner wall of the acoustic channel is provided with a convex region and a concave region adjacent to each other. The convex region is closer to the front cavity than the concave region.

As an improvement, the upper shell, the speaker unit and the lower shell together form a back cavity. The back cavity is air-coupled with the resonance cavity through the membrane.

As an improvement, the yoke includes an upper surface close to the upper shell and is provided with a receiving groove recessed from the upper surface. The membrane is received in the receiving groove and is flush with the upper surface.

As an improvement, the secondary magnetic unit includes a secondary magnet and a secondary magnetically conductive plate attached on the secondary magnet. The frame is fixed to the secondary magnetically conductive plate.

In the speaker module according to the present disclosure, the resonance cavity can enhance the high-frequency sensitivity, thereby improving the acoustic performances. In addition, there is no need for the speaker module to set a leakage hole in the shell for the back cavity, thus, the speaker module can also save the space and simplify the production process.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
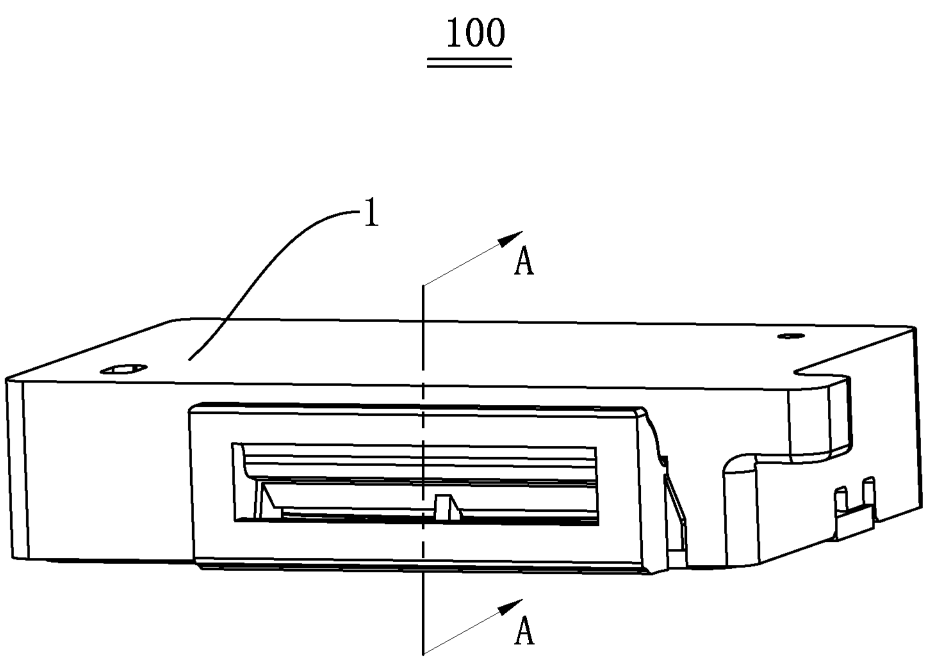
FIG. 1 is an isometric view of a speaker module in accordance with an exemplary embodiment of the present disclosure.
Figure 2:
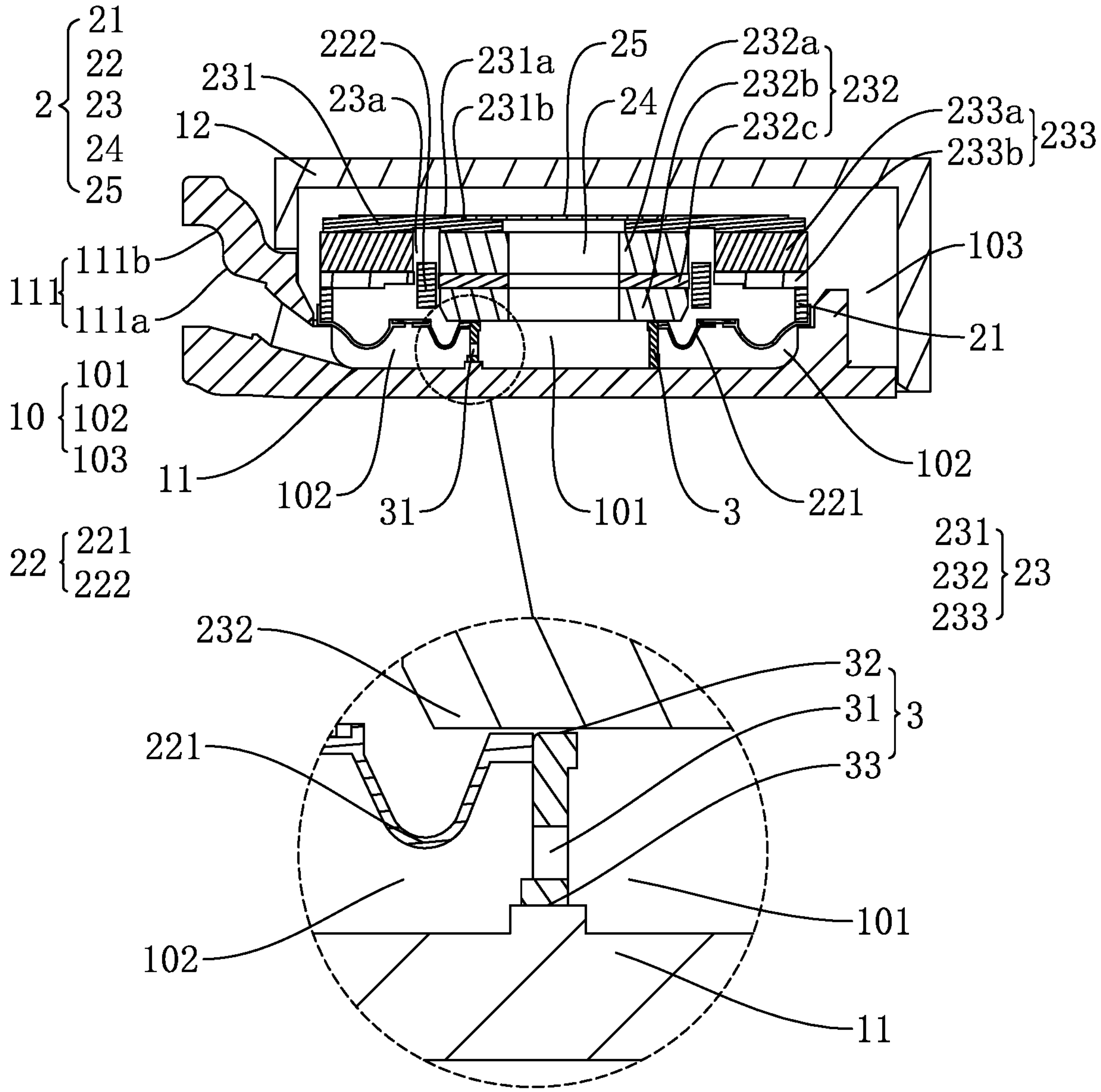
FIG. 2 is a cross-sectional view of the speaker module, taken along line A-A in FIG. 1.
Figure 3:
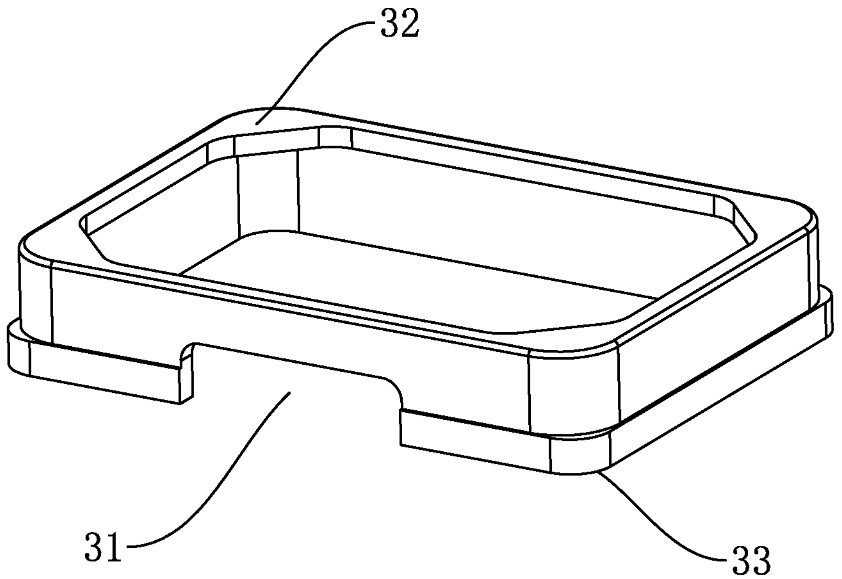
FIG. 3 is an isometric view of a ring body of the speaker module in FIG. 1.

Referring to FIGS. 1-3, the present disclosure discloses a speaker module 100 including a shell 1 having a containing space 10, and a speaker unit 2 contained in the containing space 10.

The shell 1 includes a lower shell 11 and an upper shell 12 engaged with the lower shell 11 for forming the containing space 10. The lower shell 11 is provided with an acoustic channel 111 disposed at a side of the speaker module 100. An inner wall of the acoustic channel 111 is provided with a convex region 111*a* and a concave region 111*b* adjacent to each other. The convex region 111*a* and the concave region 111*b* not only can enlarge the sound outputting area and improve the smoothness of outputting sounds, but also can prevent some dust and foreign matters from entering the speaker module 100.

The speaker unit 2 includes a frame 21, and a vibration system 22 and a magnetic circuit system 23 that are fixed to the frame 21.

The magnetic circuit system 23 includes a yoke 231, a main magnetic unit 232 disposed on the yoke 231, and a secondary magnetic unit 233 disposed on the yoke 231 and surrounding the main magnetic unit 232 for forming a magnetic gap 23*a*. The yoke 231 is used for magnetically shielding, and also for converging magnetic fields of the main magnetic unit 232 and the secondary magnetic unit 233 and holding the main magnetic unit 232 and the secondary magnetic unit 233. The speaker module 100 further includes a ring body 3 sandwiched between the main magnetic unit 232 and the lower shell 11. The main magnetic unit 232 includes an upper main magnet 232*a* and a lower main magnet 232*b* opposite to each other and a main magnetically conductive plate 232*c* sandwiched between the upper main magnet 232*a* and the lower main magnet 232*b*. The secondary magnetic unit 233 includes a secondary magnet 233*a* and a secondary magnetically conductive plate 233*b* attached on the secondary magnet 233*a*. The frame 21 is fixed to the secondary magnetically conductive plate 233*b*.

The vibration system 22 includes a diaphragm 221 and a voice coil 222 located in the magnetic gap 23*a* for driving the diaphragm 221 for vibrating and emitting sounds. When the voice coil 222 is energized, the voice coil 222 electromagnetically interacts with the magnetic circuit system 23 for driving the diaphragm 221 for vibrating and emitting sounds. The diaphragm 221 is in a ring shape, an outer edge of the diaphragm 221 is fixed to the frame 21, and an inner edge of the diaphragm 221 is fixed to the main magnetic unit 232 and surrounds the ring body 3.

The speaker unit 2 further includes a through hole 24 penetrating through the yoke 231 and the main magnetic unit 232. In this embodiment, the through hole 24 penetrates through the yoke 231, the upper main magnet 232*a*, the lower main magnet 232*b* and the main magnetically conductive plate 232. The ring body 3 and the inner edge of the diaphragm 221 are fixed to the lower main magnet 232*b*.

The speaker unit 2 further includes a waterproof and air-permeable membrane 25 attached on the yoke 231 and covering a side of the through hole 24 close to the upper shell 12. The yoke 231 includes an upper surface 231*a* close to the upper shell 12 and is provided with a receiving groove 231*b* recessed from the upper surface 231*a*. The membrane 25 is received in the receiving groove 231*b* and is flush with the upper surface 231*a* of the yoke 231.

The membrane 25, the main magnetic unit 232, the ring body 3 and the lower shell 11 together form a resonance cavity 101. The diaphragm 221, the lower shell 11 and the ring body 3 together form a front cavity 102. The acoustic channel 111 communicates the front cavity 102. The front cavity 102 communicates with the outside through the acoustic channel 111. The convex region 111*a* is closer to the front cavity 102 than the concave region 111*b*.

The ring body 3 is provided with an access 31 communicating the resonance cavity 101 and the front cavity 102. The ring body 3 includes a first end 32 fixed to the lower main magnet 232*b* and a second end 33 fixed to the lower shell 11. The access 31 locates at a side of the ring body 3 close to the acoustic channel 111 and is formed by recessing from the second end 33 toward the first end 32. When the vibration system 22 vibrates and emits sounds, the high-frequency sounds enter into the resonance cavity 101 through access 31 and resonate, thereby enhancing the high-frequency sensitivity.

The upper shell 12, the speaker unit 2 and the lower shell 11 together form a back cavity 103. Since the resonance cavity 101 communicates with the outside through the access 31, the front cavity 102 and the acoustic channel 111, further the back cavity 103 is air-coupled with the resonance cavity 101 through the membrane 25, on one hand, the air pressure of the back cavity 103 is consistent with the outside air pressure, thereby eliminating air pressure imbalance which makes the diaphragm 221 bulging or dented and affects the acoustic performances, on the other hand, there is no need for the speaker module 100 to set a leakage hole in the shell 1 for the back cavity 103, thus, the speaker module 100 can also save the space and simplify the production process.

In the speaker module 100 according to the present disclosure, the resonance cavity 101 can enhance the high-frequency sensitivity, thereby improving the acoustic performances. In addition, there is no need for the speaker module 100 to set a leakage hole in the shell 1 for the back cavity 103, thus, the speaker module 100 can also save the space and simplify the production process.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A speaker module, comprising:

a shell having a containing space, comprising an upper shell and a lower shell engaged with the upper shell for forming the containing space;

a speaker unit contained in the containing space, comprising:

a frame;

a magnetic circuit system fixed to the frame, comprising a yoke, a main magnetic unit disposed on the yoke, and a secondary magnetic unit disposed on the yoke and surrounding the main magnetic unit for forming a magnetic gap;

a vibration system fixed to the frame, comprising a diaphragm in a ring shape and a voice coil located in the magnetic gap for driving the diaphragm for vibrating and emitting sounds;

a through hole penetrating through the yoke and the main magnetic unit;

a waterproof and air-permeable membrane attached on the yoke and covering a side of the through hole close to the upper shell; and a ring body sandwiched between the main magnetic unit and the lower shell;

wherein an outer edge of the diaphragm is fixed to the frame, and an inner edge of the diaphragm is fixed to the main magnetic unit and surrounds the ring body, the membrane, the main magnetic unit, the ring body and the lower shell together form a resonance cavity, the diaphragm, the lower shell and the ring body together form a front cavity, the ring body is provided with an access communicating the resonance cavity and the front cavity.

2. The speaker module as described in claim 1, wherein the main magnetic unit comprises an upper main magnet and a lower main magnet opposite to each other and a main magnetically conductive plate sandwiched between the upper main magnet and the lower main magnet, the through hole penetrates through the yoke, the upper main magnet, the lower main magnet and the main magnetically conductive plate, the ring body and the inner edge of the diaphragm are fixed to the lower main magnet.

3. The speaker module as described in claim 2, wherein the ring body comprises a first end fixed to the lower main magnet and a second end fixed to the lower shell, the access is formed by recessing from the second end toward the first end.

4. The speaker module as described in claim 1, wherein the lower shell is provided with an acoustic channel disposed at a side of the speaker module, the acoustic channel communicates the front cavity.

5. The speaker module as described in claim 4, wherein the access locates at a side of the ring body close to the acoustic channel.

6. The speaker module as described in claim 4, wherein an inner wall of the acoustic channel is provided with a convex region and a concave region adjacent to each other, the convex region is closer to the front cavity than the concave region.

7. The speaker module as described in claim 1, wherein the upper shell, the speaker unit and the lower shell together form a back cavity, the back cavity is air-coupled with the resonance cavity through the membrane.

8. The speaker module as described in claim 1, wherein the yoke comprises an upper surface close to the upper shell and is provided with a receiving groove recessed from the upper surface, the membrane is received in the receiving groove and is flush with the upper surface.

9. The speaker module as described in claim 1, wherein the secondary magnetic unit comprises a secondary magnet and a secondary magnetically conductive plate attached on the secondary magnet, the frame is fixed to the secondary magnetically conductive plate.

* * * * *